Patented May 26, 1936

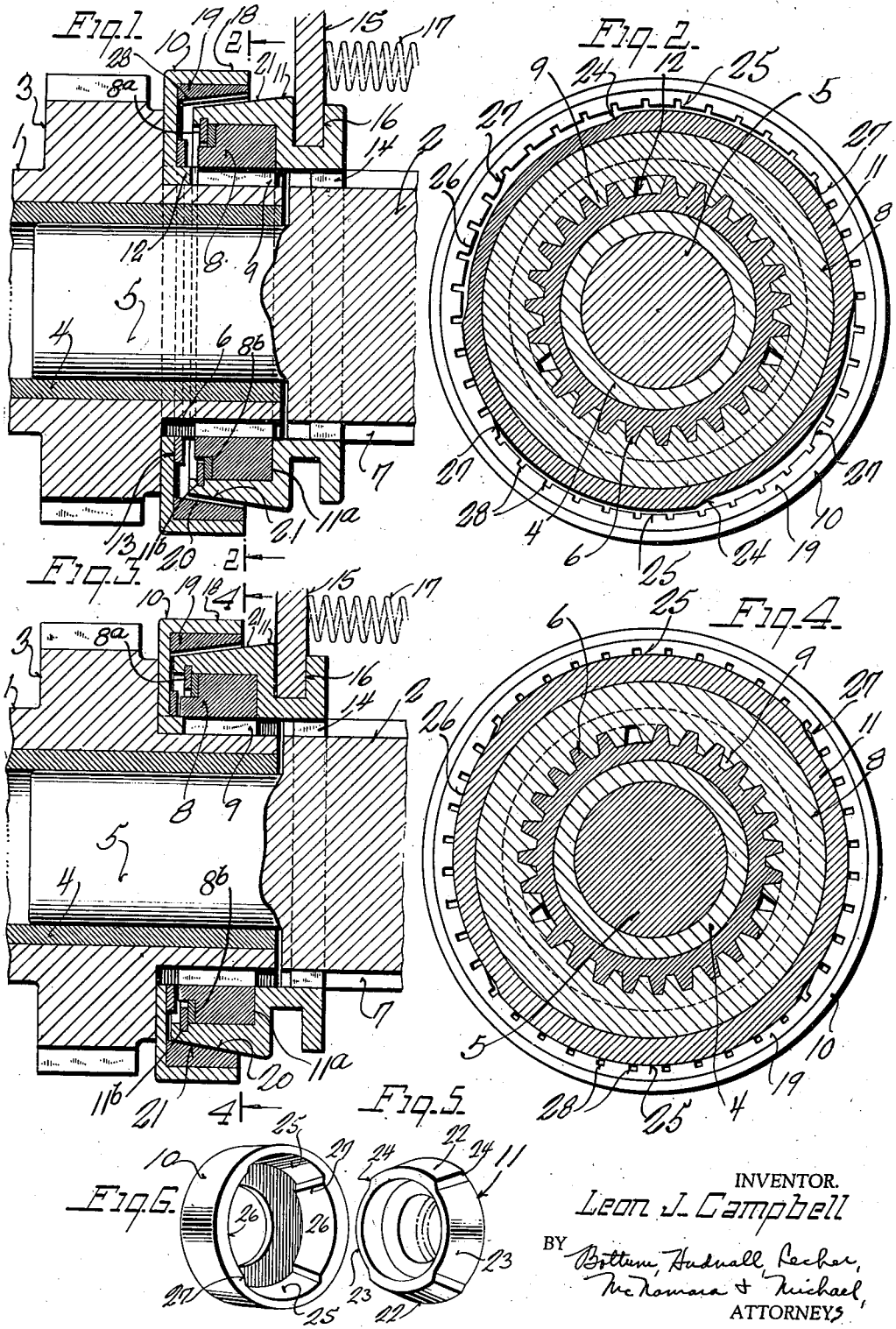

2,042,168

UNITED STATES PATENT OFFICE 2,042,168

SYNCHRONIZING CLUTCH

Leon Jay Campbell, Buchanan, Mich., assignor to Campbell-Buchanan Corporation, Chicago, Ill., a corporation of Illinois Application December 27, 1932, Serial No. 648,899

2 Claims. (Cl. 192—53)

This invention relates to synchronizing clutches for automotive change speed transmissions.

The general purpose and object of my invention is to provide a synchronizing clutch mechanism wherein the synchronizing clutch members are so constructed that in certain rotative positions they may have frictional driving engagement and positive driving engagement in others to thereby synchronize the rotative parts which they control quickly and smoothly without shock or noise.

Another object of my invention is to provide the co-acting inclined surfaces of these clutch members with concentric portions of different diameters whereby the desired slippage or relative rotation may be permitted between the members in establishing a synchronizing driving connection between them.

A further object of my invention is to provide the clutch members with means on their co-acting surfaces to break down the film of oil or lubricant between them whereby the clutch members may quickly engage for driving action.

A further object of my invention is to provide at least one of these surfaces with grooves or slots to receive and carry off the oil or lubricant removed or scraped therefrom in the relative rotation of the members while pressed together to condition the surfaces for frictional driving engagement.

The invention consists further in the matters hereinafter described and claimed.

In the accompanying drawing:

Fig. 1 is a longitudinal section of a clutch assembly of my invention, the synchronizing members of the clutch being shown in frictional driving engagement;

Fig. 2 is a transverse sectional view taken on line 2—2 of Fig. 1;

Fig. 3 is a view similar to Fig. 1 showing the synchronizing clutch members in positive driving engagement;

Fig. 4 is a transverse sectional view taken on line 4—4 of Fig. 3; and

Figs. 5 and 6 are perspective views on a reduced scale of the synchronizing clutch members in completely separated relation.

In the drawings, 1, 2 indicate the alined driving and driven shafts of an automotive change speed transmission of a type in general use. Shaft 1 leads from the master clutch of the vehicle and has within the transmission case a gear 3, integral with the shaft as shown in Figs. 1 and 3, and meshing with a lay shaft gear (not shown) as in devices of this character. The end of the shaft 1 at the gear 3 is made hollow and is fitted with a wear bushing 4 to receive and support the adjacent reduced end 5 of the shaft 2 as shown.

The portion of the shaft 1 beyond the inner side of the gear 3 is provided with splines 6. The portion of shaft 2 beyond the adjacent end of shaft 1 is provided with similar splines 7. The splined portions of the shafts have the same diameter and with the splines similar they will register when the shafts are synchronized. When that occurs, the clutch member 8 on the shaft 1 may be slid onto shaft 2 to connect the shafts for direct driving as required for high speed in an automotive transmission.

Clutch member 8 is in the form of a ring surrounding the shafts and has internal teeth 9 to mesh with those provided by the splines 6 and 7. Member 8 is not completely withdrawn from shaft 1 when connecting shaft 2 thereto, on the contrary, being merely slid partially onto shaft 2 to bridge the joint between the abutting or adjacent ends of the shafts and thus have connection with the splines of both shafts. Normally member 8 is entirely supported by shaft 1, at which time the shafts are disconnected and may be synchronized by the synchronizing clutch members 10 and 11 of my present invention. The member 8 fits within an annular recess 11a in the member 11 and has a rotative connection therewith. The member 8 is maintained in the recess by means of a split locking ring 8a overlapping the member 8 on the open side of the recess 11a as shown in Figs. 1 and 3. The ring 8a is preferably of spring material and snaps into a groove 11b in the member 11 when connecting the members together. A wear ring 8b is interposed between the member 8 and the locking ring 8a. This wear ring is preferably keyed on the member 11. The keying may take the form of diametric lugs on the wear ring, which lugs engage in key slots provided in the inner surface of the recess 11a.

Members 10 and 11 are annular in shape and are mounted on the respective shafts 1 and 2 on opposite sides of the positive clutch member 8. Member 10 fits over the splined portion of shaft 1 and is fixed thereto by lugs 12 and a split clamping ring 13. The lugs 12 are carried by the member 10 and fit in the spaces between certain of the splines 6 to hold the member against rotation on the shaft 1. The lugs project beyond the front side of the member 10 and are overlapped by the ring 13. The latter encircles the splines 6 and tightly engaging the same holds the member 10 against the inner side of the gear 3.

Member 11 is slidably, but non-rotatably connected with shaft 2 on the splined portion thereof, having internal teeth 14 for that purpose. Member 11 is shaped to surround member 8, there being a suitable connection between them for movement in unison in an axial direction when member 11 is shifted laterally by the shifting element or yoke 15 engaged therewith as shown. Member 11 has an annular recess 16 to receive the yoke, the latter by a spring means, indicated generally at 17 in the drawing, being normally pressed in a direction to engage members 10 and 11. The spring means does not engage the yoke in the manner shown in Figs. 1 and 3 in an actual installation. It is embodied in the control for the transmission and acts when released to force member 11 into engagement with member 10.

Member 10 has an overhanging annular portion or flange 18 extending toward member 11, as shown. This flange is lined with a wear resisting ring 19 having a tapered or inclined surface 20 to co-act with a complementary inclined surface 21 about the periphery of member 11. The portion of member 11 provided with this surface extends into member 10 so that the members fit one within the other when engaged, as shown in Figs. 1 and 3. At this time the shafts 1 and 2 are disconnected by the positive clutch member 8 and the members 10 and 11 may act to synchronize the shafts as intended by my invention.

The co-operating inclined surfaces 20, 21 of the members 10 and 11, in accordance with my invention, are provided with arcuate portions of different diameters, permitting frictional driving engagement of the members in certain rotative positions, and positive driving engagement in others. This is accomplished by providing the member 11 with diametrically disposed arcuate sections 22, 22 of one diameter and the intermediate joining sections 23, 23 of a slightly lesser diameter. Where these sections join, well defined edges 24 are formed, as shown in Fig. 5.

The inclined surface 20 of the member 10 is similarly made, the arcuate sections 25 being of the larger diameter, while the sections 26 are of the smaller, there being edges 27 provided between the sections where they join as shown. The corresponding sections on the two members are complementary throughout as to pitch or angle, diameter and circumferential length, so that the members may completely interfit, as shown in Figs. 3 and 4, when the members register as to their respective sections. At this time, the sections of the largest and of the smallest diameters on the respective members interfit and the members are connected together in positive driving engagement.

When the sections 22 of the largest diameter on member 11 engage the sections 26 of the smaller diameter on member 10, the members cannot completely interfit by reason of the difference in the diameters of the engaged sections, as shown in Figs. 1 and 2. The members 10 and 11 by the spring pressure on them tend to frictionally engage and do so as soon as the oil film on their engaged surfaces is broken down by the edges 24, 27. These edges in the relative rotation of the members act to scrape the oil film from the inclined surfaces and condition them for frictional engagement so that the driving member will pick up the driven member without shock or noise. The inclined surface 20 of the member 10 is provided with radial grooves or slots 28 to receive and carry off the accumulated oil, the grooves opening through the outer edge of the ring 19, as shown.

Should the frictional engagement between the members when they initially engage, be insufficient to synchronize them, the members will slip as allowed by their inclined surfaces, and will assume positive driving connection when they reach that relation. This will remain unless the load on the driving member is too great, whereupon the members by reason of their inclined surfaces will separate and slippage be allowed until synchronization is established either by a frictional or a positive driving engagement between the members. As soon as this condition is established, the positive clutch member 8 is drawn into engagement with the splined portion of the shaft 2, the member 11 being drawn out of engagement with the member 10 at the same time through the yoke 15. It may be remarked at this point, that the back and forth movement given to the yoke 15 to accomplish this result, is automatically controlled through the operation of the hand shift lever or other equivalent part by which the speed changes in the transmission are effected. In my co-pending application, Serial No. 635,957, filed October 3, 1932, which has matured into Patent No. 1,984,354, December 18, 1934, a spring control is provided for this purpose and may be used with the type of clutch assembly herein described and claimed.

In an automotive transmission two clutch devices as herein shown and described would ordinarily be employed, one for the direct drive as shown and the other for second or intermediate speed as in my co-pending application as aforesaid. Both clutch assemblies are alike in construction and operation, except as to the reversal of the positions of the parts for second speed.

The advantages of my novel clutch mechanism, as herein shown and described, are that a metal to metal contact is provided between the synchronizing clutch members 10 and 11 when they reach driving engagement, both at the time they drive through frictional engagement and when they drive through positive engagement. This enables the load on the driving member to be picked up quickly, yet smoothly and easily, without strain or jar on the clutch assembly or associated parts and their synchronization established within the very short range of movement allowed for the purpose in the transmission control. Moreover, the oil film is broken down shortly after the clutch members are pressed together, and no opportunity is allowed for the driving member to become so accelerated in speed as to produce a shock and noise when the members engage on their co-acting surfaces becoming sufficiently dry for the purpose. With the arrangement of arcuate sections between the members, they may rapidly engage and disengage in their relative rotation and thus quickly establish synchronization for the parts controlled thereby. This feature also allows the use of relatively slight tapers for the co-acting surfaces of the clutch members, with the result that a heavy spring pressure is not required for pressing them together. The advantage of this is that the transmission control or the operator as the case may be, is not required to overcome a heavy spring pressure to disconnect the synchronizing clutch members when moving the positive clutch member into clutching position. Another advantage of the construction is that the clutch members 10 and 11 may frictionally and positively engage more than once in each complete revolution of the members. This follows from the fact that the projections and the recesses provided on the interfitting inclined annular surfaces of the clutch members are substantially equal in circumferential extent and are diametrically and alternately arranged as shown in Fig. 6. When these parts each comprise approximately a fourth of the circumference of their respective clutch members as shown in Fig. 6, the clutch members may frictionally and positively engage twice in each complete revolution of the members. This reduces the extent of rotative slippage between the clutch members before they postively engage and the shock and jar incident to their positive engagement is so reduced as to provide for a smooth and easy acting clutch device. The projections on the clutch member 11 are provided by the arcuate sections 22 of the larger diameter. The recesses are provided by the sections 23 of the smaller diameter. On the clutch member 10, the projections 26 are of the smaller diameter, and the recesses 25 are of the larger diameter. When the peripheral surfaces of the projections engage, the clutch members have frictional driving engagement. On the other hand a positive driving connection is established when the projections on one clutch member enter the recesses on the other. The clutch members rotate about a common axis and the projections and the recesses are concentric with that axis. The sides of the projections and the recesses on each clutch member are joined by inclined portions enabling rotative slippage of the clutch members under a torque strain in excess of the holding action of the projections and the recesses when interfitting.

As shown in Figs. 1 and 3, the positive clutch member 8 fits rotatably in the synchronizing clutch member 11 to rotate relative thereto, both when on shaft 1 and when connecting shafts 1 and 2 together. By a split ring arrangement shown in these figures, the clutch member 8 is connected with the member 11 to slide in unison therewith, thereby providing axial movement for the member 8 through the member 11.

The details of construction and arrangement of parts shown and described may be variously changed and modified without departing from the spirit and scope of my invention, except as pointed out in the appended claims.

It is to be of course understood that the clutch mechanism of my invention as herein shown and described, when installed in an automotive change speed transmission, will run in the presence of the lubricant contained in the transmission case, and thus be subject to the provision of a lubricant film on the members 10 and 11 between the co-operating inclined surfaces thereof.

I claim as my invention:

1. In a synchronizing clutch mechanism for automotive change speed transmissions, co-operating synchronizing clutch members, said synchronizing clutch members having interfitting inclined portions provided with arcuate sections of different diameters whereby the members in certain rotative positions may have frictional driving engagement and positive driving engagement in others, said sections where they join on the respective members providing edges to scrape the lubricant from the co-acting surfaces of the members in their relative rotation, and slots in the surface of one member to receive the lubricant scraped from the members.

2. In combination, aligned driving and driven shafts having their opposed portions closely arranged and similarly splined, a pair of cooperating clutch members on the respective shafts, one clutch member being fixed to the driving shaft for rotation thereby, and the other clutch member being slidably mounted on the driven shaft by engagement with the splines thereof for movement into and out of clutching engagement with the clutch member on the driving shaft, said clutch members having interengageable inclined annular surfaces provided with arcuate projections and recesses concentric with the axes of said shafts whereby said clutch members when engaged may have frictional driving engagement when the peripheral surfaces of the projections are engaged and positive driving engagement when the projections on one clutch member enter the recesses on the other clutch member, and a third clutch member slidably mounted on the driving shaft by engagement with the splines thereof and movable by the clutch member on the driven shaft into engagement with the splines of the same for positively connecting the shafts by the third clutch member following disengagement of the first mentioned clutch members on synchronization of the shafts thereby, said third clutch member having a rotative connection with the clutch member on the driven shaft.

LEON JAY CAMPBELL.